2,813,899

POLYMERIC DICARBOXYLIC ACIDS AND DERIVATIVES

Alfred Coles Haven, Jr., Wilmington, Del., assignor to E. I. du Pont de Nemours and Company, Wilmington, Del., a corporation of Delaware No Drawing. Application February 9, 1956,
Serial No. 564,351

6 Claims. (Cl. 260—515)

This invention is directed to the preparation of new compositions of matter which are essentially linear difunctional hydrocarbons of a molecular weight within the range of 500 to 3000.

Difunctional intermediates are necessary in the preparation of linear fibrous and elastomeric polymers. For example, condensation polymerization of dicarboxylic acids with diols or diamines leads to polyesters or polyamides. Similarly, polyurethanes may be obtained from glycols and diisocyanates.

It is an object of this invention to provide new polymeric dicarboxylic acids and the hydroxy derivatives of said acids in which the carboxy or hydroxy groups are separated by long hydrocarbon units. It is a further object of the present invention to provide a method for preparing polymeric dicarboxylic acids essential to the formation of difunctional hydrocarbons suitable as intermediates for linear superpolymers.

More specifically, it is an object of the present invention to produce a difunctional compound of the formula X—C—(A—B)$_m$—A—C—X, wherein X is a carboxyl group or —CH$_2$OH; $m$ is an integer from 1 to 4; A is a diradical formed by removing one hydrogen from each ring of a gem diphenylalkane; B is a C$_6$ to C$_{21}$ alkylene radical having at least 3 carbon atoms in the bivalent alkylene unit, and C is a C$_3$ to C$_{17}$ alkylene radical having at least 3 carbon atoms in its bivalent alkylene unit.

It has been discovered that difunctional hydrocarbons of molecular weight 500 to 3000 may be obtained by coalkylating a gem diphenylalkane, e. g., diphenylmethane, with an unconjugated diene and an unconjugated unsaturated carboxylic acid, in certain molar proportions, in the presence of anhydrous hydrogen fluoride as condensing agent. The resulting polymeric dicarboxylic acids are substantially free of mono- and polyfunctional side products and are readily reduced to the corresponding diols. These diols are suitable for the preparation of linear superpolymeric polyurethanes having elastomeric properties, by reaction with an organic diisocyanate followed by further chain extension with water. A gem diphenylalkane is a disubstituted compound wherein the disubstitution is carried out on the same carbon atom with two identical phenyl radicals.

The dicarboxylic acids of the above formula (X=CO$_2$H)

may be prepared by coalkylating, in the presence of liquid anhydrous hydrogen fluoride as condensing agent, $n$ moles of a gem diphenylalkane (A) with a combination of $n-1$ moles of an unconjugated diolefin (B) having 6 to 21 carbon atoms, and 2 moles of an aliphatic unconjugated unsaturated carboxylic acid (C) having from 4 to 18 carbon atoms, $n$ being an integer from 2 to 5.

The gem diphenylalkanes (A) may be represented by the formula C$_6$H$_5$—CR$_1$R$_2$—C$_6$H$_5$, where —CR$_1$R$_2$— is 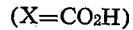 an alkylidene radical. R$_1$ and R$_2$ therefore may be H or alkyl; the alkyl radicals are preferably primary alkyl radicals. Gem diphenylalkanes may be prepared by condensing 2 moles of benzene with 1 mole of an aliphatic aldehyde or ketone. The total carbon content of the alkylidene radical will be limited primarily by the availability of the aldehydes and ketones. Those having up to 10 carbon atoms are readily accessible (e. g., from the corresponding alcohols); it is meant to include those gem diphenylalkanes, e. g., 1,1-diphenyldecane, which may be derived from them. For reasons of economy it is preferred to use gem diphenylalkanes ranging from the methane through the butanes with diphenylmethane the preferred compound. Other specific compounds which may be employed are: 1,1-diphenylethane; 1,1-diphenylpropane and 2,2-diphenylpropane; 1,1- and 2,2-diphenylbutanes including 1,1-diphenyl-2-methylpropane; 1,1-, 2,2-, and 3,3-diphenylpentanes and the corresponding hexanes; 1,1-, 2,2-, 3,3- and 4,4-diphenylheptanes and the corresponding members of the octane series; and the like.

To obtain the dicarboxylic acids substantially free of mono- and polyfunctional acids both the diolefin (B) and the ethylenically unsaturated carboxylic acid (C) must be unconjugated; i. e., the unsaturated centers are separated by at least one and preferably 2 or more saturated carbon atoms. Furthermore, it is essential that anhydrous hydrogen fluoride be the condensing agent at temperatures below its normal boiling point and preferably at about 0–5° C.

Suitable unconjugated diolefins are found in the acyclic (straight- or branched-chain) and in the alicyclic hydrocarbon series. Representative dienes having 6 to 21 carbon atoms and at least one saturated carbon atom separating the olefinically unsaturated groups are: 1,4-hexadiene, 1,5-hexadiene (biallyl); 1,4-heptadiene, 1,6-heptadiene; 2,6-octadiene, 4-methyl-1,5-heptadiene, 2,5-dimethyl-1,5-hexadiene; 2,7-nonodiene; 4,5-dimethyl-2,6-octadiene; 4-vinylcyclohexene, 1-(3-butenyl)-1-cyclohexene; 1,15-hexadecadiene, 1,18-nonodecadiene, 1,20-heneicosadiene, and the like.

In dienes of the alicyclic series, it is preferred that at least one of the ethylenically unsaturated groups be extranuclear, e. g., as in 4-vinylcyclohexane and in 1-allylcyclopentene. It is also preferred that at least 2 saturated carbon atoms separate the olefinic groups, e. g., as in 1,5-hexadiene, 1,15-hexadecadiene and the like.

Conjugated dienes and alpha,beta-unsaturated carboxylic acids are unsatisfactory as they homopolymerize under the conditions of our process to extraneous polymeric substances. These secondary reactions, in depleting the available supply of diolefin and/or of unsaturated acid, drastically alter the mole ratios of the reactants that are needed to yield dicarboxylic acids.

Suitable unsaturated carboxylic acids may be represented by the formula R—CO$_2$H, where R is an unsaturated aliphatic hydrocarbon radical of from 3 to 17 carbons, where the carboxyl group is separated from the ethylenic double bond by at least one saturated carbon atom and preferably by 2 or more saturated carbon atoms. R may be an alkenyl or cycloalkenyl radical; it may be a cycloalkenyl-substituted alkyl group (as distinguished from an alkenyl-substituted alkyl group or an alkyl-substituted alkenyl group which are mere homologs of an alkenyl radical); it may be an alkyl- or cycloalkyl-substituted cycloalkenyl group. As indicated above, R is attached to the carboxyl group through one or more saturated carbon atoms. Examples of specific unconjugated unsaturated carboxylic acids are: 3-butenoic, 3- and 4-pentenoic, 2-methyl-3-pentenoic, 3-methyl-3-butenoic, 3-, 4-, and 5-hexenoic, 4-methyl-3-pentenoic, 6-heptenoic, 5-methyl-4-hexenoic, 3-ethyl-3-pentenoic, 7-octenoic, 2-ethyl-3-hexenoic, 8-nonenoic, 7-, 8-, 9- and 10-undecenoic acids; 2-cyclopentene carboxylic acid, 2-cyclopentenylacetic acid, 3-cyclohexene carboxylic acid, cyclohexenylacetic acid, 7-cycloheptylidene-heptanoic acid, 6-cyclohexyl-5-hexenoic acid, and octadecenoic acids such as oleic and elaidic acids. Preferred acids are 10-undecenoic acid and oleic acid.

The present invention in its simplest form is defined by $n=2$; that is, reaction of 2 moles of A with 1 mole of B and 2 moles of C yields dicarboxylic acids of the formula X—C—(A—B)$_m$—A—C—X, where $m=1$. Structures of A, B and C may be varied as defined to produce a variety of these dicarboxylic acids. The smallest member of this series, corresponding to a molecular weight of 592, is derived from 2 moles of diphenylmethane, 1 mole of biallyl and 2 moles of 3-butenoic acid. The invention is also adapted to the preparation of more complex structures. Thus, in addition to varying the chemical nature of A, B and C, the mole ratios of these reactants may be varied so that $n=2$, 3, 4, or 5. A practical limit for obtaining dicarboxylic acids represented by the above formula is reached when $n=5$. When $n$ is greater than 5, the carboxylic acids produced are no longer substantially free of mono- and/or polyfunctional compounds, as indicated by the failure of these carboxylic acids to produce linear polymers; instead, gelled, i. e., three dimensional structures are formed. As stated, successful coalkylation of a gem diphenlyalkane (A) with diolefin (B, defined) and unsaturated acid (C, as defined), in molar ratios of A:B:C of $n:(n-1):2$, where $n=2$ to 5, depends upon the use of liquid anhydrous hydrogen fluoride as the condensing agent. Coalkylation of A by B and C proceeds smoothly in HF to give substantially pure products in excellent yields.

Accordign to the present invention, a gem diphenylalkane, a diolefin and an unsaturated acid as defined, are used in mole ratios providing one ethylenically unsaturated center for each phenyl ring to be alkylated; there are at least two phenyl rings for each molecule of unsaturated carboxy acid.

The dicarboxylic acids of the present invention have relatively high molecular weights, low volatility, and are either difficult to distill or not distillable; they tend to be viscous liquids and are difficult to crystallize. It is therefore highly desirable to be able to avoid tedious and costly separation and purification steps in recovering them from the reaction mixture. These objects are achieved by using hydrogen fluoride as the condensing agent in the preparative reaction.

These dicarboxylic acids are prepared by addnig a mixture of the proper proportions of a gem diphenylalkane, a diolefin and an unsaturated acid to an excess of anhydrous hydrogen fluoride below the normal boiling point of HF, preferably at 0 to 5° C. The reaction mass is worked up by drowning the charge in water and taking up the reaction product in an organic solvent which is immiscible with water and which is sufficiently volatile to be recovered by distillation, e. g., benzene, ethyl ether, petroleum ether or mixtures of these and the like. The organic layer is washed free of hydrofluoric acid with water, and then evaporated in vacuo to yield the desired dicarboxylic acids.

Hydrogen fluoride has the unique advantage over other typical Friedel-Craft catalysts such as aluminum chloride, ferric chloride, titanium chloride, etc., in being an extremely efficient catalyst for alkylations at temperatures that are low enough to suppress secondary reactions leading to complex cross-linked and tarry products.

The surprising feature of the present invention is that relatively high molecular weight hydrocarbon-dicarboxylic acids are produced to the virtual exclusion of mono- and polyfunctional products.

The dicarboxylic acids formed may be reduced to the corresponding diols (X=CH$_2$OH in the structural representation) in high yields by conventional methods. These diols, in turn, may be converted into polymeric products, e. g., polyesters or polyurethanes, on reaction with polyacids (or polyacid chlorides) or organic polyisocyanates. Using a diisocyanate, such as toluene-2,4-diisocyanate, for example, linear polyurethanes are obtained. By "linear" is meant extended, chainlike, polymers as distinguished from three-dimensional, cross-linked structures. That these polyurethanes are substantially free from the cross-linked (gelled) structures is shown by their ready solubility in a solvent such as tetrahydrofuran. The intrinsic viscosities of these solutions show that the solutes are polymeric; the original dicarboxylic acids from which said diols are produced are substantially free of tri- and polyfunctionality.

EXAMPLE 1

A. A mixture consisting of:

16.8 g. (0.1 mole) diphenylmethane
18.5 g. (0.1 mole) 10-undecylenic acid
5.4 g. (0.05 mole) 4-vinylcyclohexene was added dropwise in one hour to 100 ml. of anhydrous hydrogen fluoride at 0–5° C., while stirring. The reaction mass was stirred for 0.5 hour and poured onto ice. One hundred ml. each of benzene and ethyl ether were added and the mixture was shaken thoroughly. The organic layer was separated, washed with water until it was HF free, then evaporated under reduced pressure (up to 100° C. at 0.25 mm. of Hg) to yield 38.8 g. (of the theoretical 40.7 g.) of an amber, viscous oil.

*Analyses*

|  | Found | Required by theory |
| --- | --- | --- |
| Carbon | 83.0, 83.2 | 82.7 |
| Hydrogen | 9.42, 9.48 | 9.42 |
| Neutral Equiv | 447.3 | [1] 406.6 |

[1] Calculated for the dibasic acid of molecular weight 813.2.

B. A mixture of 36.3 g. of the above product, 8 g. of lithium aluminum hydride and 500 ml. of tetrahydrofuran was held at its reflux temperature for 2 hours. The mixture was cooled to 0° C. and treated with sufficient saturated aqueous ammonium chloride solution to destroy any unreacted LiAlH$_4$ and to liberate the reduction product from its complexes with aluminum. The mass was filtered and the cake of inorganic salts was washed with small quantities of tetrahydrofuran. The organic solution of the combined filtrate and washings was evaporated in vacuo, finally at 100° C. and <1 mm. of Hg to obtain 34.5 g. of the glycol.

*Analyses*

|  | Found | Required by theory |
| --- | --- | --- |
| Carbon | 84.2, 84.0 | 85.4 |
| Hydrogen | 9.91, 9.89 | 10.27 |
| Hydroxy-Number | 162.3, 162.8 | [1] 143 |
| Acid-Number | 0.63 |  |

[1] Calculated for C$_{50}$H$_{90}$O$_2$, glycol of molecular weight 786.

C. A mixture of 22.4 g. of the above glycol and 8.5 g. of toluene 2,4-diisocyanate (corresponding to a mole ratio of diisocyanate to glycol of 1.5 to 1) was heated at 100° C. for 3 hours. The product, a viscous liquid, was dissolved in 100 ml. tetrahydrofuran. This solution was treated with one gram of water (corresponding to 9 times the theoretical quantity necessary to convert the free isocyanate groups in the polymer into urea groups and thus further extend the chain length) and allowed to stand at room temperature for 72 hours. No insoluble gel formed, indicating absence of trifunctionality in the polymer. The solution was allowed to evaporate in a pan. The residue was worked on a rubber mill at 100° C. to volatilize residual traces of tetrahydrofuran and then milled to give a sheet of raw stock having an elongation before break of 100 to 200%.

EXAMPLE 2

A. A mixture consisting of:

16.8 g. (0.1 mole) diphenylmethane
14.6 g. (0.05 mole) 1,20-heneicosadiene, and
18.5 g. (0.1 mole) 10-undecenoic acid was added dropwise in one hour to 100 ml. of anhydrous hydrogen fluoride at 0–5° C. The reaction mass was poured onto ice and the oil that separated was taken up in a benzene-ethyl ether mixture (100 ml. of each) and washed free of HF with water. The organic layer was dried over anhydrous magnesium sulfate and concentrated at 100° C. and less than 1 mm. of Hg pressure to 48 g. (of the theoretical 49.9 g.) of a yellow, honey-like oil.

*Analyses*

|  | Found | Required by theory [1] |
|---|---|---|
| Carbon | 82.0 | 83.0 |
| Hydrogen | 10.6 | 10.5 |
| Neutral-Equiv | 609 | 498.5 |

[1] Calculated for a dibasic acid of empirical formula $C_{69}H_{104}O_4$, molecular weight 997.

B. A solution of 42.8 g. of the above condensation product in 100 ml. of tetrahydrofuran was slowly added to a refluxing solution of 8 g. of lithium aluminum hydride in 300 ml. tetrahydrofuran. The reaction mass stirred and held at its temperature of reflux for one hour, then cooled to about 0° C. Saturated aqueous ammonium chloride was added in sufficient quantity to precipitate all of the aluminum as inorganic salts, and the mass was filtered. The filter cake of inorganic material was washed with small quantities of benzene and the combined organic filtrate and washings were concentrated at 100° C. and less than 1 mm. of Hg pressure to an oil weighing 39.7 g.

*Analyses*

|  | Found | Required by theory [1] |
|---|---|---|
| Carbon | 83.8 | 85.5 |
| Hydrogen | 11.1 | 11.25 |
| Hydroxyl-Number | 123 | 116 |
| Acid-Number | 0.13 | 0.00 |

[1] Calculated for a glycol of molecular weight 969 and having an empirical formula $C_{69}H_{108}O_2$.

C. The glycol obtained under B above was converted into an elastomeric polyurethane as follows: 22.75 g. of glycol and 8.7 g. of toluene-2,4-diisocyanate (mole ratio of diisocyanate to glycol=2 to 1) were mixed and held at 75° C. for 20 minutes. Two ml. of water were blended into the resulting viscous liquid and the mass was baked at 80° C. for one hour. Milling on a rubber mill gave a tough, flexible sheet of polyurethane elastomer which was readily soluble in tetrahydrofuran.

A strip 1.5 x 7.5 cm. of this polyurethane was so weighted that in 5 hours it had elongated to 34.5 cm. (366% elongation). On standing overnight, with the weights removed, it contracted to a length of 16 cm.

EXAMPLE 3

A mixture of:

22.25 g. (0.1 mole) 1,15-hexadecadiene
33.6 g. (0.2 mole) diphenylmethane
36.8 g. (0.2 mole) 10-undecenoic acid was added to 50 ml. anhydrous hydrogen fluoride over a one-hour period. After being stirred for an additional 0.5 hour at 0–5° C. the mixture was poured into ice water. The precipitated oil was taken up in 200 ml. of a 1:1 mixture of ethyl ether and petroleum ether, washed free of HF with water and concentrated at 100° C. and 1 mm. of Hg pressure to an oil weighing 90.8 grams (98% yield).

EXAMPLE 4

A mixture of:

33.6 g. (0.2 mole) diphenylmethane
56.5 g. (0.2 mole) oleic acid
29.2 g. (0.1 mole) 1,20-heneicosadiene was added to 100 ml. anhydrous hydrogen fluoride over a one-hour period at 0–5° C. The reaction mass was worked up as described previously to yield 114 g. of oily, liquid dicarboxylic acid.

A portion of this product was reduced with lithium aluminum hydride (following the procedures of the previous examples) to the corresponding glycol. The hydroxyl-number of 104 for this glycol corresponds to a calculated molecular weight of 1080, in fair agreement with a molecular weight of 1164 for a glycol of empirical formula $C_{83}H_{136}O_2$.

A 43.4 g. sample of this glycol was heated for one hour at 100° C. with 14.1 g. of toluene-2,4-diisocyanate. The product was dissolved in 300 ml. tetrahydrofuran, one ml. of water was added, and the solution allowed to stand at room temperature. At the end of 8 days, no gel had formed. One ml. of piperidine was added to destroy any remaining free isocyanate groups and the solution was evaporated to constant weight in vacuo at 100° C. to obtain 55.5 g. of the polyurethane.

EXAMPLE 5

The following mixture:

9.25 g. (0.05 mole) 10-undecenoic acid
21.0 g. (0.125 mole) diphenylmethane
10.8 g. (0.10 mole) 4-vinylcyclohexene was added dropwise to 100 ml. anhydrous HF at 0–5° C. After 75 minutes the mixture was poured onto ice and extracted with ethyl ether. The extract, after being washed with water to remove HF, was evaporated in vacuo at 100° C. to give 40.4 g. of an oil consisting of a mixture of dicarboxylic acids.

According to the procedures described in previous examples, this product was reduced with 6 g. of lithium aluminum hydride in 600 ml. tetrahydrofuran to the corresponding glycol, a viscous oil weighing 38.5 g.

EXAMPLE 6

Following the procedure given in Example 5, 9.25 g. (0.05 mole) of 10-undecenoic acid, 21 g. (0.125 mole) of diphenylmethane and 8.2 g. (0.10 mole) biallyl, added to 100 ml. anhydrous HF gave a substantially quantitative yield of liquid dicarboxylic acid.

I claim:

1. A difunctional compound of the general formula X—C—(A—B)$_m$—A—C—X, wherein X is a carboxyl group; $m$ is an integer from 1 to 4; A is a diradical formed by removing one hydrogen from each ring of a gem diphenylalkane having 1 to 10 carbon atoms in the alkylidene radical; B is a $C_6$ to $C_{21}$ alkylene radical having at least three carbon atoms in the bivalent alkylene unit, and C is a $C_3$ to $C_{17}$ alkylene radical having at least three carbon atoms in its bivalent alkylene unit.

2. A difunctional compound of the general formula set forth in claim 1 wherein $m$ is 1.

3. A process for preparing dicarboxylic acids by co-alkylating, at a temperature below the normal boiling point of anhydrous hydrogen fluoride, in the presence of liquid anhydrous hydrogen fluoride, $n$ moles of a gem diphenylalkane having 1 to 10 carbon atoms in the alkylidene radical with $n-1$ moles of an unconjugated diolefin having 6 to 21 carbon atoms and 2 moles of an aliphatic unsaturated unconjugated carboxylic acid having from 4 to 18 carbon atoms, $n$ being an integer from 2 to 5.

4. The process of claim 3 wherein $n$ equals 2.

5. A process for preparing dicarboxylic acids by co-alkylating, at a temperature below the normal boiling point of anhydrous hydrogen fluoride, in the presence of liquid anhydrous fluoride, $n$ moles of a gem diphenyl-alkane having 1 to 10 carbon atoms in the alkylidene radical with $n-1$ moles of an unconjugated diolefin having 6 to 21 carbon atoms and 2 moles of an aliphatic unsaturated unconjugated carboxylic acid having from 4 to 18 carbon atoms, $n$ being an integer from 2 to 5.

6. A difunctional compound having the formula

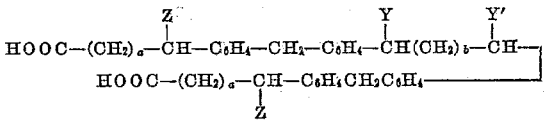

wherein Z is taken from the group consisting of $CH_3$ and H; $a$ being 8 when X is $CH_3$ and $a$ is 9 when Z is H; Y is taken from the group consisting of $CH_3$ and H, $b$ is an integer within the range of 2 to 4, $b$ being 2 when Y and Y' are $CH_3$ and 4 when Y and Y' are H.

No references cited.